United States Patent Office 3,504,484
Patented Apr. 7, 1970

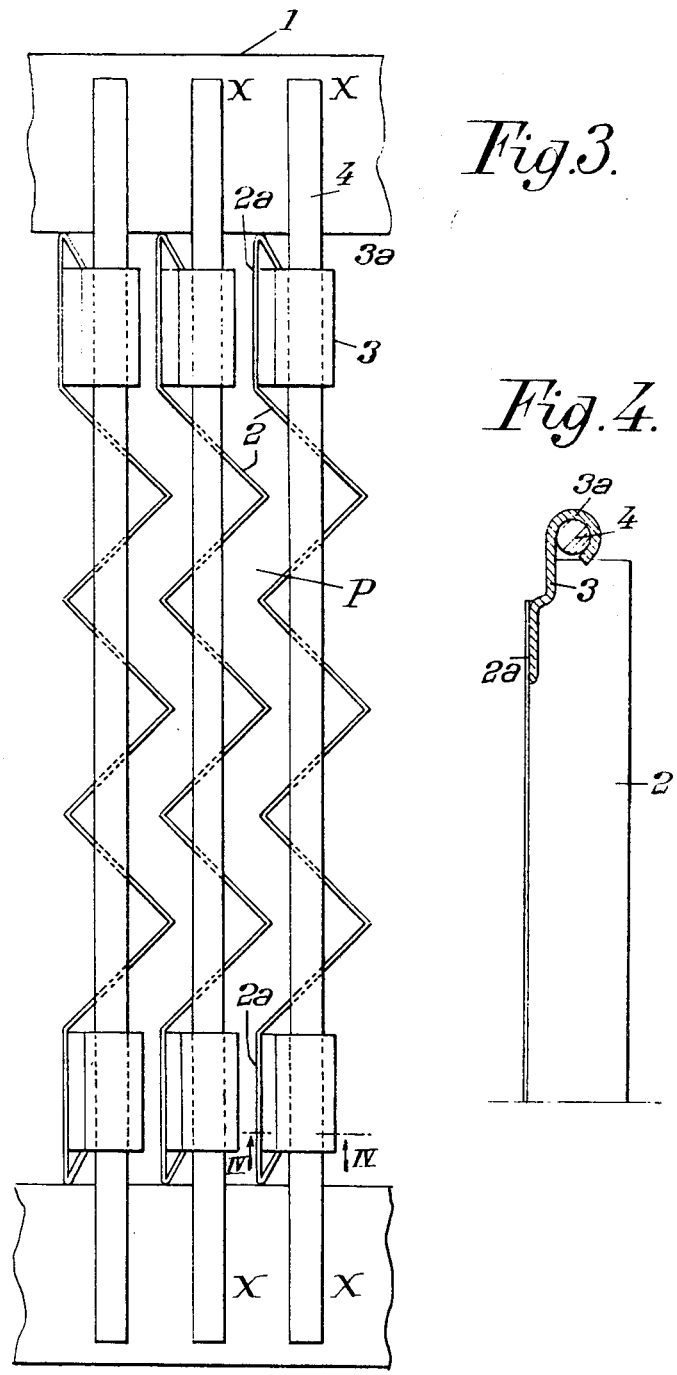

3,504,484
INSTALLATIONS HAVING BAFFLE PLATE SEPARATORS
Jean Buffet, Paris, France, assignor to Ameliorair (Societe Anonyme), Paris, France
Continuation of application Ser. No. 643,205, June 2, 1967. This application Jan. 22, 1969, Ser. No. 796,292
Claims priority, application France, Dec. 16, 1966, 87,754
Int. Cl. B01d *50/00;* E05c *15/00*
U.S. Cl. 55—257         10 Claims

ABSTRACT OF THE DISCLOSURE

An installation in which a gaseous fluid circulates, such as an air-conditioning installation, having a baffle plate-separator for separating suspended particles, such as water droplets, from the gaseous fluid. The separator comprises several baffle plates mounted pivotably about axes parallel to the flow of the gaseous fluid at the inlet of the separator, these axes being preferably situated in the neighborhood of one of the two edges of the baffle plates parallel to the flow. And locking means are provided, preferably in the neighborhood of the outer edges of the baffle plates, for locking the baffle plates during operation of the installation.

---

This application is a continuation of application Ser. No. 643,205, filed June 2, 1967, now abandoned.

The invention relates to installations in which a gaseous fluid circulates, this gaseous fluid containing, in suspension, particles of solid and/or liquid bodies, these installations comprising at least one baffle plate separator through which the gaseous fluid flows, this separator being arranged so that a large part of the suspended particles are constrained to deposit on the walls delimiting the baffle plates in question; the invention relates more particularly, but not exclusively, to air-conditioning installations, since it is in this application that the invention seems to have the most interest. In such air-conditioning installations, the air constitutes the gaseous fluid and contains, in suspension, droplets of water which it is desired to have deposited on the walls delimiting the baffle plates of the separator of the installation, with a view to eliminating these droplets.

The invention has for its object, in particular, to construct these installations such that they respond better than in the past to various practical considerations, in particular concentrating the cleaning of their separators.

The installation comprises a separator which principally comprises a plurality of plates, of rectangular shape, oriented parallel to the flow of the gaseous fluid at the inlet of the separator, each of these plates having, on at least one of its two faces, surface irregularities delimiting with the opposite face of the adjacent plate a winding passage.

Prior to this invention it was known in installations of the type mentioned above to mount the baffle plates of the separator pivotably about axes running perpendicular to the flow of the gaseous fluid at the inlet of the separator. Such an arrangement is intended to facilitate the cleaning of the separator. However it suffers from the disadvantage that the separator is only accessible for cleaning from one side (usually the outlet plane, since the axes are usually situated in the inlet plane). Furthermore, once the separator is constructed, it is no longer possible to choose the plane at which it is to be accessible. Thus, a separator which is accessible only at its outlet plane cannot be mounted in an installation which does not permit access to the outlet plane of the separator, and vice versa.

The installation according to the invention is characterized by the fact that each of these baffle plates is mounted pivotally about an axis parallel to the flow at the inlet of the separator and situated, preferably, in the neighborhood of one of the two edges of the plate parallel to this flow, locking means being provided, preferably in the neighborhood of the other edge of the plate, to lock the assembly of plates during operation of the installation.

Thus is will be possible, when it is desired to clean the separator and after having rendered the locking means inoperative, to have easy access, both at the inlet plane and at the outlet plane of the separator, to each and every winding passage of the separator by pivoting at least one of the two groups of plates situated on each side of the winding passage being considered.

The invention comprises, apart from this principal feature, certain other features which are preferably used at the same time and which will be mentioned more explicitly hereafter.

In any case, the invention can be well understood with the aid of the following complementary description and accompanying drawings, which complementary description and drawings are, of course, merely given by way of example.

FIGURE 3 is a plan view from above, on a larger scale, of a portion of the separator shown in FIGURE 1;

FIGURE 4 is a section along IV—IV of FIG. 3;

Figure 7:
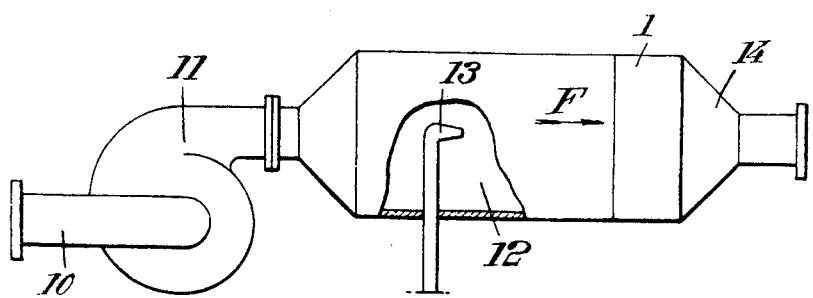
FIGURE 7 shows an overall schematic diagram, partly cut away, of an air-conditioning installation incorporating a separator as shown in the previous figures.

Referring first to FIGURE 7, the invention has been shown as applied to an air-conditioning installation including a baffle plate separator 1 (which will be described in detail later on with reference to the other figures) arranged so that a large part of the water droplets in suspension in the air are deposited on the walls delimiting the baffle plates of this separator.

The air-conditioning installation comprises an inlet conduit 10 which leads the air to a ventilator or blower 11 from where it passes to a humidification chamber 12 in which the air is charged with water droplets by means of a spray device 13, this humidification chamber 12 being situated upstream of the baffle plate separator designated by the reference numeral 1. The direction of flow of the air charged with water droplets into the separator 1 is indicated by the arrow F. From the separator 1, the air flows into a distribution unit 14 which distributes the conditioned air.

The separator 1 comprises a plurality of plates 2, of rectangular shape, oriented parallel to the flow at the inlet of the separator 1 (parallel to the arrow F), each plate 2 having on at least one of its two faces surface irregularities or corrugations delimiting, with the opposite face of the adjacent plate 2 a winding zig-zag passage P.

Figure 1:
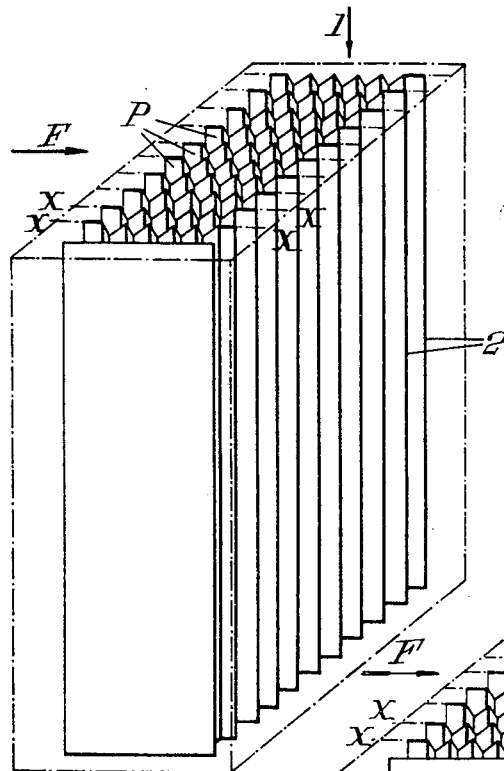
FIGURE 1 is a schematic perspective view of a baffle plate separator of an installation according to the invention, the baffle plates being shown in operative position.
Figure 2:
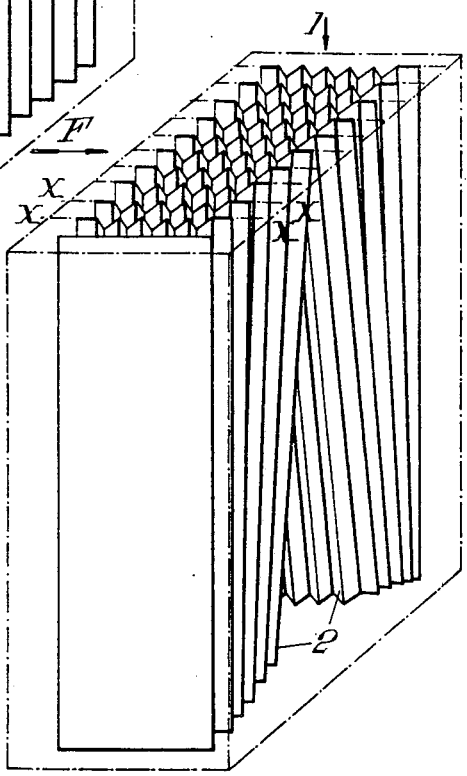
FIGURE 2 shows the baffle plate separator of FIGURE 1 in the position which they occupy during maintenance of the installation.

These surface irregularities can advantageously, as shown in FIGURES 1 and 2, be obtained by folding the plate 2 along lines perpendicular to the flow at the inlet of the separator 1, the section of the plate 2 through a plane parallel to this flow and perpendicular to the said lines then having, as visible in FIGURE 3, the shape of a zig-zag line.

This being the case, and according to the principal feature of the invention, each plate 2 is mounted pivotably about an axis XX parallel to the flow at the inlet of the separator, and situated, preferably, in the neighborhood of one of the two edges of the plate 2 parallel to this flow, locking means being provided, preferably in the neighborhood of the other edge of the plate 2 for locking the assembly of plates 2 during operation of the installation.

It can be seen that, when it is desired to clean the separator 1, it will be possible, after having rendered the locking means inoperative, to have easy access, both at the inlet plane and at the outlet plane of the separator 1, to each and every winding passage P by pivoting at least one of the two groups of plates 2 situated on each side of the winding passage P being considered.

To this end, the embodiment shown in FIGURES 1 and 2 can advantageously be used in which the separator 1 is disposed so that the axes XX of the plates 2 are horizontal, these axes XX being situated in the neighborhood of the upper edge of the plates 2, whereas the locking means are provided in the neigborhood of the lower edge of the plates 2.

As for the arrangement of the upper edge of each plate 2, this can advantageously be as shown in FIGURES 3 and 4, in which the two ends of this upper edge comprise flat flanges 2a on each of which is fixed a curved leg 3 extending slightly beyond the upper edge of the plate 2 and having a curved end 3a capable of hooking on a rod or axle 4 extending along the entire width of the plate 2 and supported at its two ends by the upper part of the separator 1.

Figure 5:
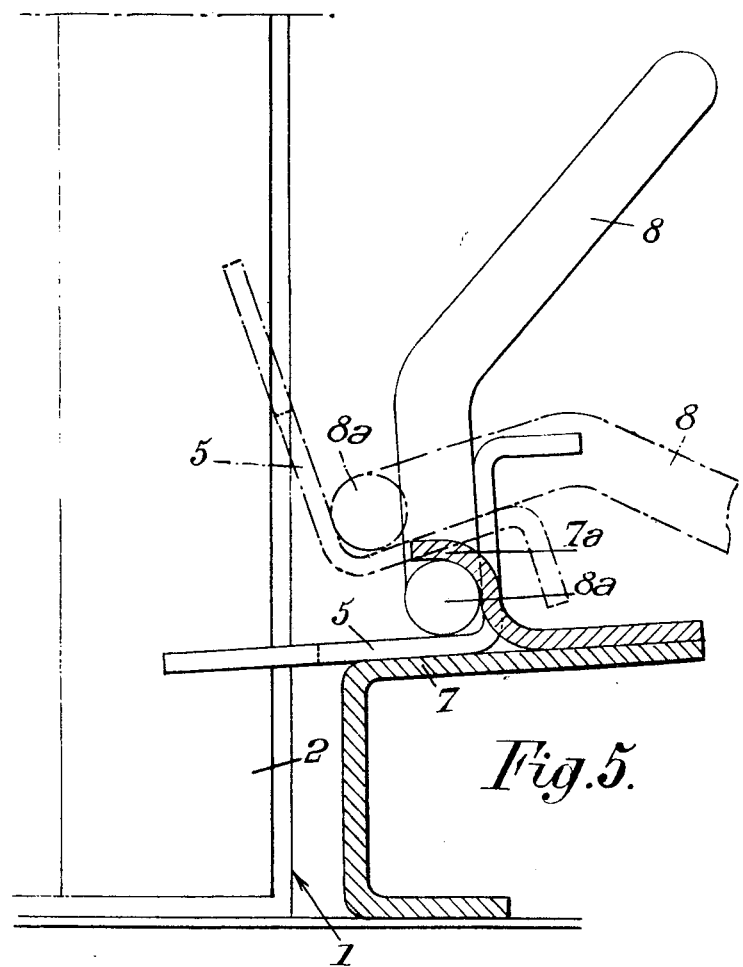
FIGURE 5 is a partial side view, on a larger scale, of the separator shown in FIGURE 1.
Figure 6:
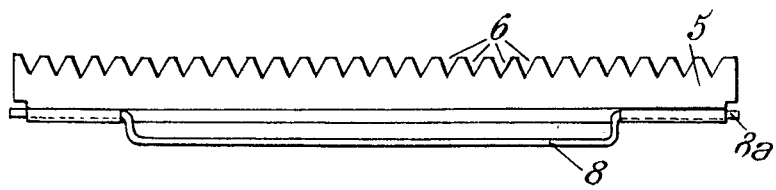
FIGURE 6 is a plan view of an element of the installation according to the invention.

The locking means can advantageously be of a movable type, as shown in FIGURES 5 and 6, and can thus comprise principally, on the one hand, a notched member 5, hereafter referred to as a "comb" comprising as many notches 6 as there are plates in the separator 1, and, on the other hand, a hooking device 7 situated at the lower part of the separator 1 at the level of the lower edge of the plates 2.

The comb 5 is preferably equipped with a handle 8 terminating, at each end of the comb 5, with a tenon 8c capable of engaging in a hook 7a formed on the hooking device 7.

In FIGURE 5, the comb 5 has been shown in solid lines engaged in the hooking device 7 and has been shown in broken lines as it is presented just before its engagement in the hooking device 7.

It is appropriate to point ou that in order to facilitate the positioning of the plates 2 in the notches 6 of the comb 5, the comb 5 can be presented just below the axes XX, moved down progessively, and then engaged in the hooking device 7.

Furthermore, it should be pointed out that such locking means can either be provided both at the inlet plane and at the outlet palne of the separator, or it can be provided in only one of these planes, for example the inlet plane, the plates then being supported by a stop member (not shown) situated, in that case, in the outlet plane of the separator.

As a result, and whatever the embodiment chosen, an installation having a baffle plate separator is provided in which the operations of cleaning of the separator can be carried out very easily and in a reduced time, since it is possible to have easy access, both at the inlet plane and at the outlet plane of the separator, to each and every winding passage of the separator by pivoting at least one of the two groups of plates situated on each side of the winding passage being considered.

In an air-conditioning installation, it is indispensable to clean the plates of the separator frequently. The frequency of the cleaning operations depends, in particular, on the quality of the water, and this frequency is relatively high if the water contains dissolved salts which have a tendency to deposit on the plates of the separator. Moreover, in certain cases (for example in the textile industry) the air is charged with dust which adheres to the plates of the separator.

This possibility of having access to the plates of the separator at the inlet plane of the separator and at the outlet plane of the separator at the same time is thus particularly advantageous, for the operations of cleaning can be carried out by two operators situated one at the inlet plane and the other at the outlet plane; the time required for these operations is thus reduced by half with respect to the time necessary for cleaning an identical separator to which one has access to the plates only at the outlet plane of the separator (which is generally the case).

Moreover, frequently the access to the plates at the outlet plane of the separator is rendered difficult, even impossible, which is the case when distribution units for the conditioned air are connected to the installation immediately downstream of the separator.

In addition, in an installation comprising a separator according to the invention whose pivotal axes of the plates are situated in the neighborhood of their upper edges, it should be mentioned that, once the cleaning of the plates has been effected, the positioning of the comb is particularly easy since the weight of the plates tends to dispose them in the position that they should occupy when the comb is to be repositioned.

I claim:

1. An air conditioning apparatus comprising a blower, water injector means disposed downstream of said blower for introducing water into the airstream produced thereby and separator means downstream of said water injector means for the separation of water droplets suspended in the airstream, said separator means comprising a separator including a plurality of vertical plates having upper and lower elongated edges and opposite side edges, the upper edges being horizontal, said plates being spaced from one another in a direction substantially perpendicular to the direction of said upper edges to define a plurality of passageways for the horizontal flow of the airstream therethrough, a plurality of horizontally extending axles, said axles being substantially parallel with one another and said passageways; means supporting said axles in fixed horizontally extending positions each extending along and pivotably supporting a respective plate proximate the upper edge thereof for pivotal movement about the respective axle on a horizontal axis extending along said upper edge and thereby parallel to the direction of the airstream whereby the plates on opposite sides of any particular passageway may be pivoted about its respectively associated axle in opposite direction to gain access to the plates at such passageway from both side edges thereof, said plates being corrugated in a horizontal direction to impose successive alternate changes in direction in each passageway and thereby to the airstream passing therethrough so as to retain water droplets present in said airstream, releasable comb locking means having a plurality of grooves each engaging a respective vertical plate proximate the lower edge thereof to secure the plates in fixed, suspended relation during passage of the airstream therethrough, said locking means being releasable from said plates to enable the plates to freely hang and be pivotably movable to gain access to said plates; and housing means having a spaced apart inlet and outlet, said housing means defining a fluid flow path between said inlet and outlet, said blower, injector means, and said separator means being disposed within said housing means with said blower disposed adjacent said inlet and said separator means disposed adjacent said outlet.

2. Apparatus as claimed in claim 1 wherein said grooves are positioned in said comb locking means in accordance with the freely hanging positions of the plates to enable all of the plates to be engaged and locked simultaneously.

3. Apparatus as claimed in claim 2 wherein said comb locking means comprises a pivotable mounting enabling the locking means to move from a first position in which the plates are locked to a second position in which the plates are free for pivotal movement.

4. Apparatus as claimed in claim 3 wherein each said axle extends the length of the associated upper edge of its respective plate.

5. Apparatus as claimed in claim 4 comprising a flat flange at the upper edge of each plate proximate both side edges thereof, and a curved leg extending from each flange and engaging the associated axle for pivotal movement.

6. Apparatus as claimed in claim 3 comprising a handle means on said comb locking means for pivotably moving the same between said first and second positions.

7. Apparatus as claimed in claim 6 wherein said handle means comprises a tenon at each end of the locking means, and hook means fixed at the level of the lower edges of the plate at opposite lateral edges of said separator for receiving each said tenon when the locking means is moved to said first position and the plates are locked.

8. Apparatus as claimed in claim 1 comprising a casing enclosing said separator and having an inlet for untreated air and an outlet for humidified air.

9. Apparatus as claimed in claim 1 wherein the plates are so corrugated to provide a plurality of reversed changes in direction in each passageway.

10. Apparatus as claimed in claim 7, each said axle extending the length of the associated upper edge of its respective plate, the apparatus further comprising a flat flange at the upper edge of each plate proximate both side edges thereof, and a curved leg extending from each flange and engaging the associated axle for pivotal movement.

References Cited

UNITED STATES PATENTS

| | | | |
|---|---|---|---|
| 808,363 | 12/1905 | Hargraves | 292—345 |
| 808,897 | 1/1906 | Carrier | 55—440 X |
| 2,325,003 | 7/1943 | Beckwith et al. | 160—172 X |
| 2,334,454 | 11/1943 | Taylor et al. | 160—172 |
| 2,359,101 | 9/1944 | Flynn | 292—288 |
| 2,529,714 | 11/1950 | Turkowski | 160—168 X |
| 2,612,220 | 9/1952 | Turkowski | 160—166 |
| 2,707,993 | 5/1955 | Null | 160—168 |
| 2,752,005 | 6/1956 | Avera et al. | 55—436 |
| 2,911,011 | 11/1959 | Niehart | 55—440 X |
| 3,058,279 | 10/1962 | Metcalfe | 55—495 |
| 3,093,401 | 6/1963 | Hagendoorn | 292—207 |
| 3,141,954 | 7/1964 | Simon | 160—166 X |
| 3,150,211 | 9/1964 | Murray et al. | 261—112 |
| 3,187,488 | 6/1965 | Litvin | 55—493 |
| 3,240,001 | 3/1966 | Kuhn et al. | 55—440 X |
| 3,342,244 | 9/1967 | Streeter | 160—184 X |

FOREIGN PATENTS

| | | |
|---|---|---|
| 576,369 | 5/1959 | Canada. |
| 857,642 | 12/1952 | Germany. |
| 204,271 | 9/1923 | Great Britain. |

HARRY B. THORNTON, Primary Examiner

D. E. TALBERT, Jr., Assistant Examiner

U.S. Cl. X.R.

55—440; 160—166; 261—116; 292—345, 288